(12) United States Patent
Dujmenovic et al.

(10) Patent No.: US 7,068,329 B1
(45) Date of Patent: Jun. 27, 2006

(54) METHOD AND SYSTEM FOR PROVIDING A VIDEO SIGNAL

(75) Inventors: Feliks Dujmenovic, Richmond Hill (CA); Tomislav Jasa, Mississauga (CA)

(73) Assignee: ATI International SRL, Christchurch (BB)

(*) Notice: Subject to any disclaimer, the term of this patent is extended or adjusted under 35 U.S.C. 154(b) by 0 days.

(21) Appl. No.: 09/387,534

(22) Filed: Aug. 31, 1999

(51) Int. Cl.
 H04N 5/50 (2006.01)
(52) U.S. Cl. .................. 348/731; 348/565; 348/564; 455/782.3
(58) Field of Classification Search ........ 348/563–565, 348/568, 572, 731–735, 385.1, 588, 569, 348/566, 567, 487, 570; 455/782.3, 192
See application file for complete search history.

(56) References Cited

U.S. PATENT DOCUMENTS

| | | | | |
|---|---|---|---|---|
| 4,295,224 A * | 10/1981 | Nishimura et al. | ...... | 455/156.1 |
| 4,984,082 A * | 1/1991 | Okamura | ................... | 358/183 |
| 5,122,878 A * | 6/1992 | Heigl et al. | .............. | 358/191.1 |
| 5,148,275 A * | 9/1992 | Blatter et al. | ................ | 358/147 |
| 5,173,777 A * | 12/1992 | Dangschat | .................. | 348/705 |
| 5,194,954 A * | 3/1993 | Duffield | ..................... | 358/193.1 |
| 5,200,826 A * | 4/1993 | Seong | ........................ | 348/731 |
| 5,321,852 A * | 6/1994 | Seong | ..................... | 455/182.1 |
| 5,339,110 A * | 8/1994 | Hara et al. | .................. | 348/485 |
| 5,398,074 A * | 3/1995 | Duffield et al. | ............. | 348/564 |
| 5,410,358 A * | 4/1995 | Shackleton et al. | ......... | 348/459 |
| 5,420,642 A * | 5/1995 | Baek | ........................... | 348/565 |
| 5,485,221 A * | 1/1996 | Banker et al. | .............. | 348/563 |
| 5,579,054 A * | 11/1996 | Sezan et al. | ................. | 348/452 |
| 5,606,612 A * | 2/1997 | Griffin et al. | ............... | 380/217 |
| 5,726,715 A * | 3/1998 | Endress | ...................... | 348/565 |
| 5,737,025 A * | 4/1998 | Dougherty et al. | ......... | 348/473 |
| 5,754,253 A * | 5/1998 | Lee | ............................. | 348/565 |
| 5,809,407 A * | 9/1998 | Kasperkovitz et al. | ... | 455/184.1 |
| 5,825,429 A * | 10/1998 | Shirahata | ..................... | 348/448 |
| 5,841,483 A * | 11/1998 | Shafer | ........................ | 348/565 |
| 5,864,367 A * | 1/1999 | Clatanoff et al. | ........... | 348/441 |
| 5,900,916 A * | 5/1999 | Pauley | ........................ | 725/59 |
| 5,905,704 A * | 5/1999 | Kato et al. | ............... | 369/47.19 |
| 5,940,444 A * | 8/1999 | Jenkin et al. | ............... | 375/260 |
| 6,040,852 A * | 3/2000 | Stuettler | ...................... | 348/43 |
| 6,067,124 A * | 5/2000 | Shirahama et al. | ......... | 348/581 |
| 6,094,568 A * | 7/2000 | Kianush et al. | .......... | 455/161.1 |
| 6,172,715 B1 * | 1/2001 | Cho | ........................... | 348/565 |
| 6,229,570 B1 * | 5/2001 | Bugwadia et al. | .......... | 348/441 |
| 6,229,573 B1 * | 5/2001 | Sato et al. | .................. | 348/516 |

(Continued)

FOREIGN PATENT DOCUMENTS

JP           361016682 A  *  1/1986   ................ 427/421

(Continued)

OTHER PUBLICATIONS 2000-158568, Jan. 1999, US Derwent.*

(Continued)

*Primary Examiner*—Chris Kelley
*Assistant Examiner*—Annan Q. Shang
(74) *Attorney, Agent, or Firm*—Vedder, Price, Kaufman & Kammholz, P.C.

(57) ABSTRACT

In accordance with the specific embodiment of the present invention, a tuner alternates between receiving a first video signal and a second video signal, such that every other frame of a specific signal is received. This is accomplished by writing to an IF1 and IF2 control register, during a vertical blanking interval. Subsequently, the video images are displayed in full motion video by interpolating the alternating frames of data not received by the tuner.

4 Claims, 7 Drawing Sheets

U.S. PATENT DOCUMENTS

| | | | |
|---|---|---|---|
| 6,233,227 B1 * | 5/2001 | Izumi | 370/280 |
| 6,240,211 B1 * | 5/2001 | Mancuso et al. | 382/236 |
| 6,260,193 B1 * | 7/2001 | Chang et al. | 725/121 |
| 6,285,865 B1 * | 9/2001 | Vorenkamp et al. | 455/307 |
| 6,384,868 B1 * | 5/2002 | Oguma | 348/564 |
| 6,388,713 B1 * | 5/2002 | Saiki et al. | 348/353 |
| 6,400,895 B1 * | 6/2002 | Webb et al. | 386/131 |
| 6,441,863 B1 * | 8/2002 | Miyazaki et al. | 348/567 |
| 6,445,306 B1 * | 9/2002 | Trovato et al. | 340/825.24 |
| 6,449,018 B1 * | 9/2002 | Yokoyama | 348/565 |
| 6,480,542 B1 * | 11/2002 | Prange et al. | 375/240.15 |
| 6,784,945 B1 * | 8/2004 | Norsworthy et al. | 348/731 |

FOREIGN PATENT DOCUMENTS

| | | | |
|---|---|---|---|
| JP | 361050471 | * | 3/1986 |
| JP | 361052080 A | * | 3/1986 |
| JP | 404117783 A | * | 4/1992 |

OTHER PUBLICATIONS 1990-003686, Jan. 1990, US Derwent.*

* cited by examiner

METHOD AND SYSTEM FOR PROVIDING A VIDEO SIGNAL

FIELD OF THE INVENTION

The present invention relates generally to providing video signals, and more specifically to providing multiple video signals using a single tuner.

BACKGROUND OF THE INVENTION

The use of multiple tuners in video applications to provide such functions as picture in a picture (PIP) is well known. By providing such capabilities, it is possible for a user to monitor multiple channels simultaneously.

In order to display simultaneous full motion video images, playback devices, such as televisions, have to incorporate multiple tuners. The multiple tuners may be incorporated within an individual playback device, or may be in external devices, such as video cassette recorder, whereby the external device provides the a received signal the playback device.

The use of multiple tuners within a television increases the overall cost of a system. Cabling and associated connectors increase the cost of systems where an external tuner is used to provide a received signal to a television to provide the second full motion video image. The use of an external tuner further requires the use of multiple control devices, such as remote controls, to control each of the tuning devices. Multiple tuners within a television inherently increase the cost of the system. The increased complexity of such systems is disadvantageous. Therefore, a method and system for overcoming the disadvantages of the prior art systems would be advantageous.

BRIEF DESCRIPTION OF THE DRAWINGS

FIGS. 7 and 8 illustrate, in flow diagram form, specific implementations of the method of the present invention.

DETAILED DESCRIPTION OF THE DRAWINGS

In accordance with a specific embodiment of the present invention, a tuner alternates between receiving a first video signal and a second video signal, such that every other frame or field of video data is received for each specific signal. The signals are alternatively received by providing alternating data values in each of an IF1 and IF2 control register. The values are switched during the vertical blanking interval of the received data. Subsequently, the video images are displayed in full motion video by interpolating the missing fields of data not received by the tuner.

Figure 1:
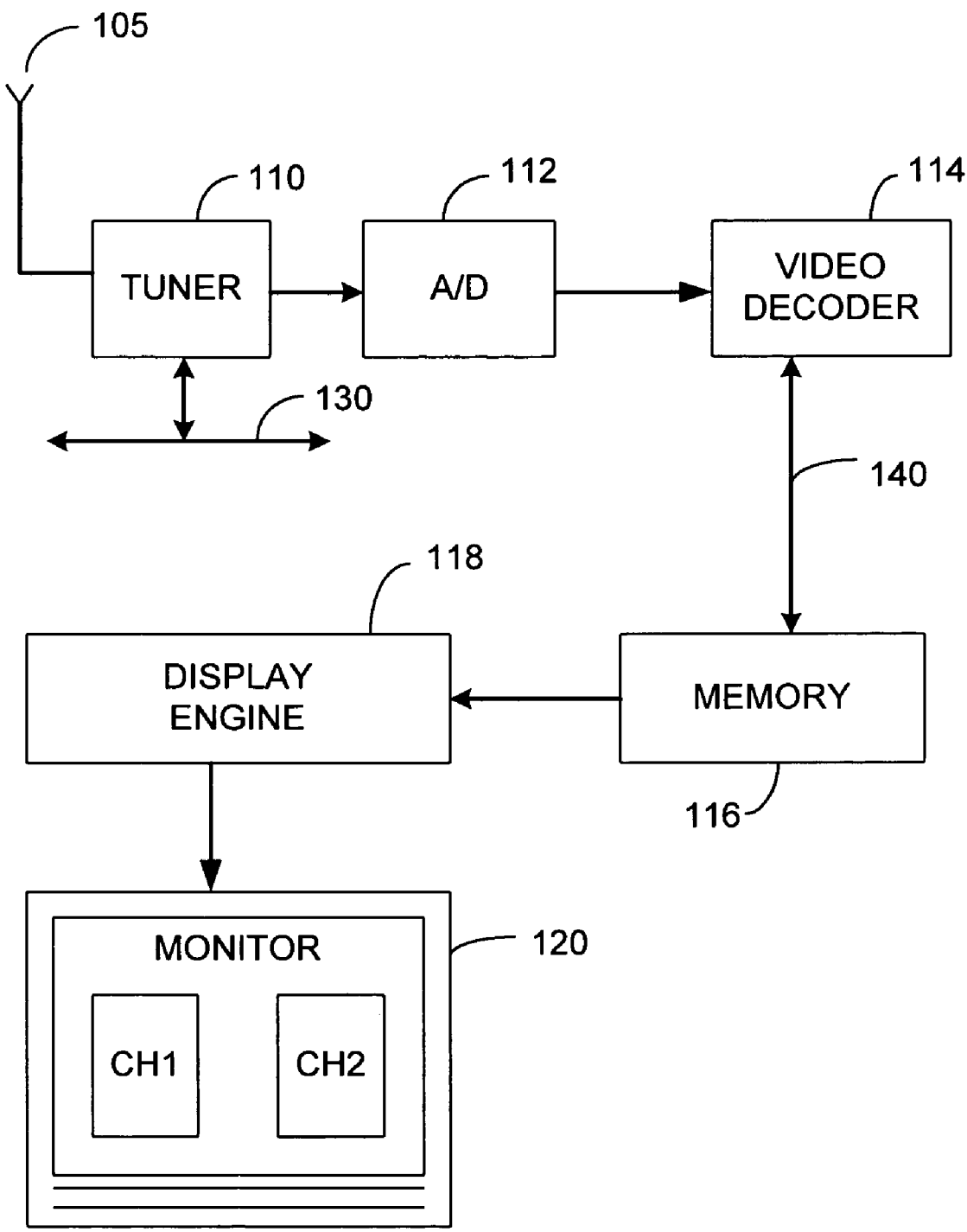
FIG. 1 illustrates, in block diagram form, a system in accordance with the present invention.

The present invention is best understood with reference to the figures. FIG. 1 illustrates a block diagram of a system in accordance with the present invention. FIG. 1 includes an antennae 105 connected to a tuner 110. The tuner 110 is connected to an analog-to-digital converter 112. The analog-to-digital converter 112 is connected to the video decoder 114. The video decoder 114 is connected to the memory 116. Memory 116 is connected to display engine 118. The display engine 118 is connected to the display device 120.

In operation, the tuner 110 receives a signal from antennae 105. Generally, the signal received from antennae 105 would be understood to include composite signals of the type associated traditionally transmitted video signals. However, it would be understood that the antennae 105 can also represent signals received in a compressed or uncompressed form, from other media, including the internet, and other transmission media whereby multiple signals are transmitted at various frequencies.

The tuner 110 selects one of the plurality of received signals based upon information received across the bus 130. By receiving a plurality of information across the bus 130, it is possible for the tuner 110 to switch between a plurality of frequencies, thereby allowing the tuner 110 to provide the information necessary to display a plurality of video images on the display device 120. The information provided by the tuner 110 is provided to the analog to digital converter 112. The analog-to-digital converter 112 converts the received analog signals into a digital format. The converted digital information is provided to the video decoder 114.

The video decoder 114 decodes the digital information from it retrieved format into a digital data of a chosen protocol. Such protocols include such as a YUV color space protocol, or an RGB color space protocol. The decoded information generated by the video decoder 114 is stored via bus 140 in memory 116. Note that additional processing of the decoded signal can occur between the actual decoding of the data and its storage in the memory 116.

Once stored in memory 116, the display engine 118 accesses the memory 116 to retrieve the stored image and provide it to the display device 120. As discussed previously, with reference to the tuner 110, data representing multiple images is being received by the tuner 110, which represent a single tuner. The received information is stored in separate locations within the memory 116.

In a specific implementation, where the tuner 110 is alternatively receiving fields of data on multiple channels, it is be necessary for the video decoder, or some other portion of the system, to interpolate the missing image data. For example, where the tuner 110 alternates receiving fields from a first frequency (associated with a first channel) and a second frequency (associated with a second channel), only every other field of a given channel will be provided by the tuner 110. Therefore, it is necessary for the video decoder, or some other portion of the graphics adapter, to interpolate the missing image data based upon the received data alternating received fields. Examples of such techniques, which are well know, and include vertical filtration.

Fields associated with a plurality of full motion video channels are stored in memory 116 for retrieval by the display engine 118. When displayed upon the display device 120, multiple channels of video can be viewed. Generally, the multiple channels are displayed in separate windows where a computer monitor is being used.

Figure 2:
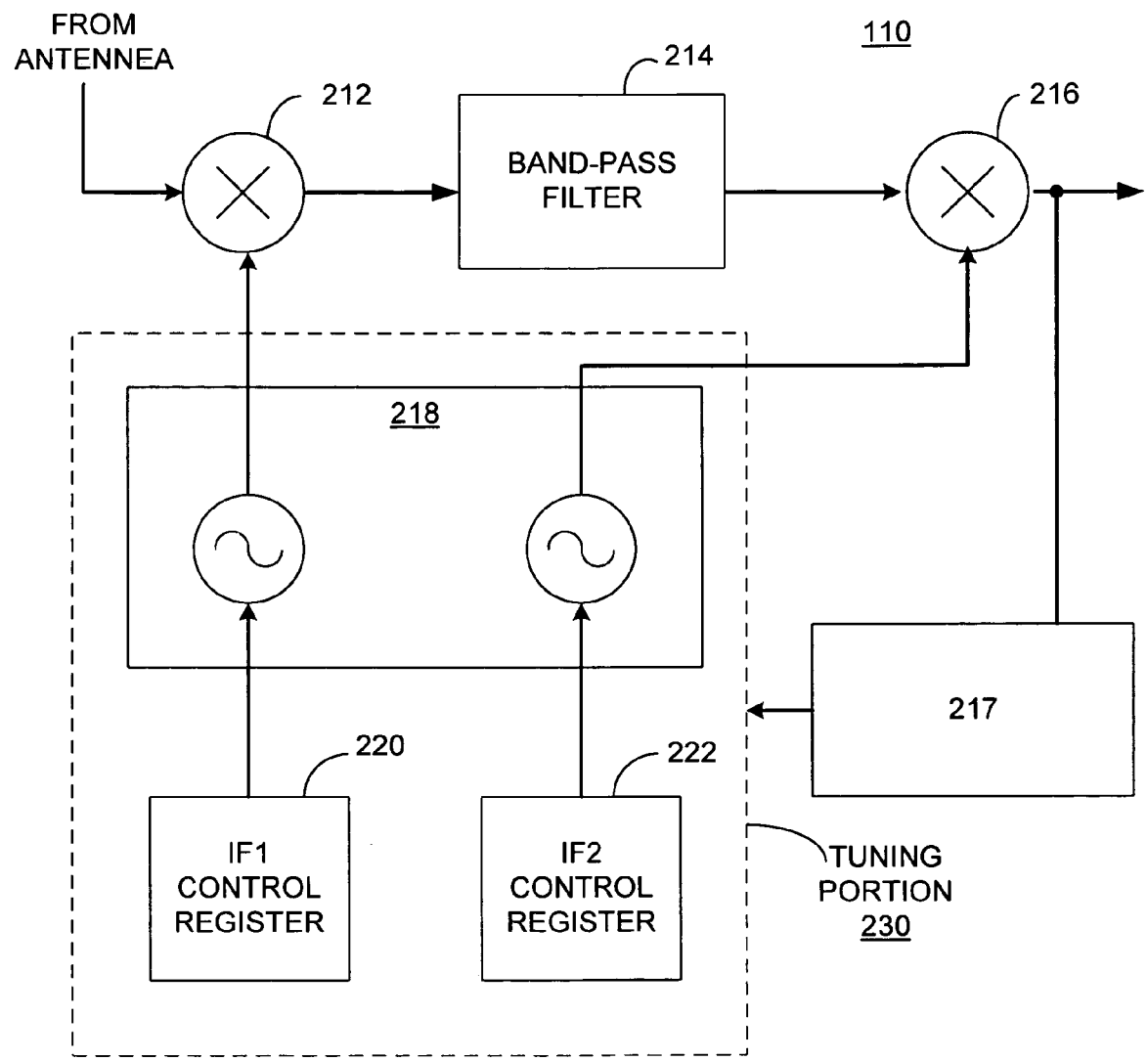
FIG. 2 illustrates, in block diagram form, the tuner of FIG. 1 in greater detail.

FIG. 2 illustrates in block diagram form a portion of the tuner 110 in accordance with the present invention. Specifically, the portion of the tuner illustrated in FIG. 2 includes mixers 212 and 216, a band-pass filter 214 for performing band-pass filtering, a control portion 217, and a tuning portion 230.

In operation, the signal received from antennae 105 is combined at mixer 212 with a frequency provided by the tuning block 230. The output signal of the mixer 212 is provided to the filter block 214. The band-pass filter 214 will provide a selected channel frequency. By appropriately filtering the received signal, a specific portion of the received signal can be further processed. The filtered signal from band-pass filter 214 is provided to mixer 216, which receives a frequency from the tuning block 230. The output of the mixer 216 provides a desired IF frequency. Note the frequencies provided by the tuning block 230 determine the actual channel frequency selected. The output if mixer 216 is received by control portion 217, which provides various control functions to the tuning portion 230.

The tuning portion 230 comprises a frequency generation block 218 containing multiple frequency generators. Each of the frequency generators of portion 218 receive a frequency value. The frequency values are stored in registers 220 and 222 for specifying the IF1 and IF2 frequency values respectively.

Figure 3:
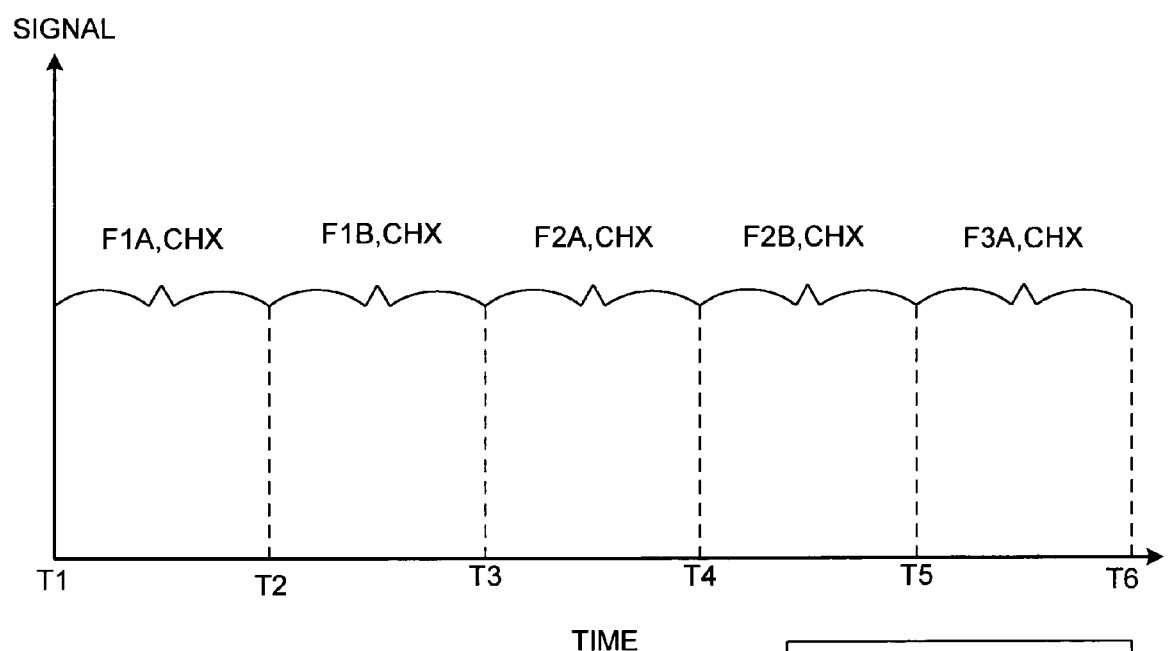
FIG. 3 illustrates, in time line form, when fields of video data are transmitted.

FIG. 3 is a time line indicating the sequence during which individual fields are received by the antenna 105. Video images include a plurality of sequential fields. By displaying the plurality of sequential frames at an appropriate rate a full motion video image is produced. Note that the channel value X is a function of the IF1 and IF2 frequency values. By providing specific IF1 and IF2 frequencies, a specific channel X can be selected.

Each frame is transmitted as two fields. Separate fields are utilized in order to improve video quality by accommodating the interlacing of images. Therefore, referring to FIG. 3, F1A and F1B represent two fields (A and B) associated with the frame 1 (F1) of channel X. Likewise, F2A, and F2B represent the two fields associated with a frame 2 of channel X.

Figure 4:
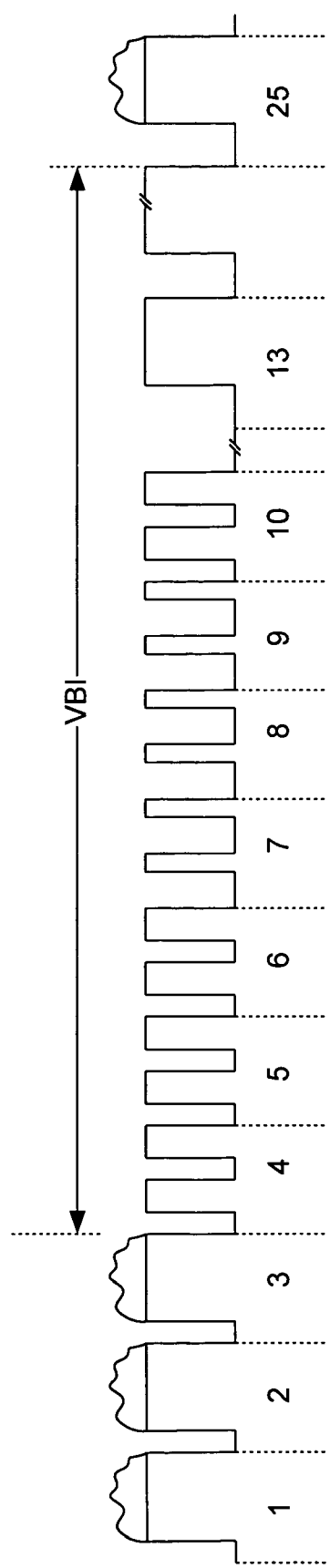
FIG. 4 illustrates, in graphical form, a composite video signal.

FIG. 4 illustrates a the vertical blanking interval associated with an NTSC composite video format. Time periods 1–3 represent the final three fields associated with a particular frame. Time periods 4–24 represent the vertical blanking interval (VBI), which includes various equalization and serration pulses (not specifically illustrated). The vertical blanking interval, in FIG. 4 is of specific interest because in a specific implementation of the present invention the tuner is changed during the VBI interval.

Referring back to FIG. 2 and assuming two channels are to be provided by the tuner 110, the IF1 control register and IF2 control register are loaded with the appropriate IF1 and IF2 values to tune into a first selected channel. In a specific embodiment, the values contained within IF1 control register and IF2 control register will be changed at a frequency allowing for adjacent fields of different channels to be received. In other words, referring to FIG. 3, the active video of a first channel will be received during time T1, and the active video for a second channel will be received during time T2

In order to accomplish receiving adjacent fields, one set of control register values would be stored in order to receive a first channel, and just prior to the second time, a second set of IF1 and IF2 control register values will be stored within the registers 220 and 222 in order to receive the field FIB associated with a second channel. In an alternating manner, the value stored within the control registers IF1 and IF2 are be changed in order to receive alternating field from each of the first and second frequency.

In an alternate embodiment, it would be understood that instead of receiving alternating fields, it would be possible to receive alternating frames. In this manner, when tuned to a first frequency, the fields F1A and F1B would be received by the tuner 110. Subsequently, the values associated with the control registers of IF1 and IF2 would be updated to reflect the second channel whereby the field F2A and field F2B of the second frame for the second channel would be received.

In addition, it is understood by one skilled in the art that in addition to receiving adjacent fields associated with a single frame, such as from T1 to T3, it would be possible to receive adjacent fields associated with different frames. In other words, frame F1B and F2A could be received for a single channel in an alternating manner. As previously discussed, interpolation techniques can be used in order to fill in the missing data in order to accommodate the display of full motion video.

In order to accommodate the rapid tuning from one channel to another, a fast tuner, such as a solid state tuner, should be used. However, the solid state tuners available support a slow bus interface protocols over the bus 130, see FIG. 1, to set the values of IF1 register and the IF2 register. Therefore, either a faster bus interface over the bus 130 needs to be used, or alternate techniques within the tuner 110 need to be used in order to support the rapid switching between channels.

In one implementation, the bus interface 130 of FIG. 1 is a bus interface capable of supporting high speed transfers of data directly to the IF1 and IF2 control registers 220 and 222. Currently, the bus 130 is an I²C bus interfaces, which is too slow to accomplish the present invention by directly writing to the register. Therefore, other proprietary or standard bus interfaces protocols capable of changing data fast enough to allow tuning into multiple channel would need to be used. Such a bus would have approximately 1.2 milliseconds to write the data and acquire locking. While possible with very fast three wire busses, or other multiple data bit protocols, such high rates may be impractical.

Figure 5:
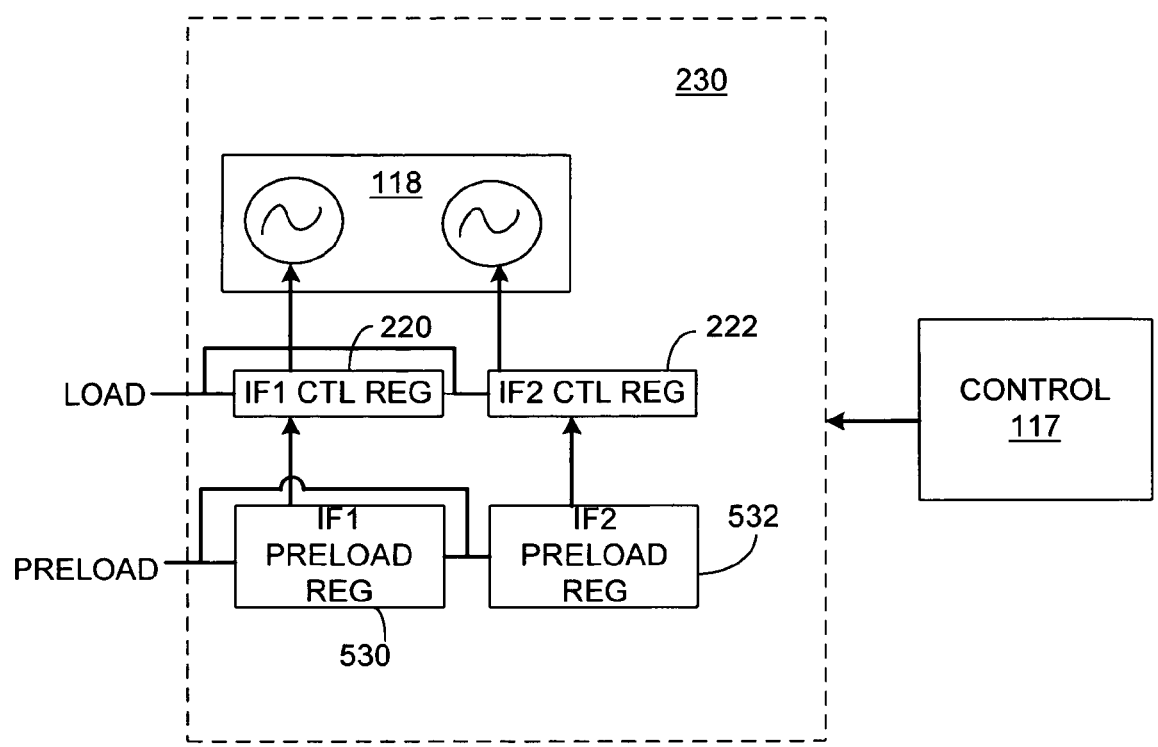
FIG. 5 illustrates, in block diagram form, an alternative implementation of the tuner of FIG. 1.

FIG. 5 illustrates another implementation of the tuning block 230 of FIG. 2 in accordance with the present invention. FIG. 5 allows for an IF1 prelude register, and an IF2 preload register to allow for rapid change of the IF values of the actual control registers 220 and 222. In this implementation, the traditional I²C bus protocol, or virtually any other bus protocol, can be used to load data into the IF1 and IF2 prelude register at any time. Once the vertical blanking interrupt a signal is detected, or other desired event, a load signal is generated in order to rapidly load the value stored preload values into the IF1 and IF2 control registers 220 and 222 respectively. Once loaded, the frequency generator 118 will generate and provide new frequencies to the mixers 112 and 116 of FIG. 2. Noted that detection of the vertical blanking interrupts signal can be accomplished through the control portion 117 of FIG. 2 which in turn would provide the load signal to the IF1 and IF2 control registers of FIG. 5. One advantage of the implementation of FIG. 5, is that it allows for the traditional I²C interface to be used since the new channel can be loaded over a longer period of time.

Figure 6:
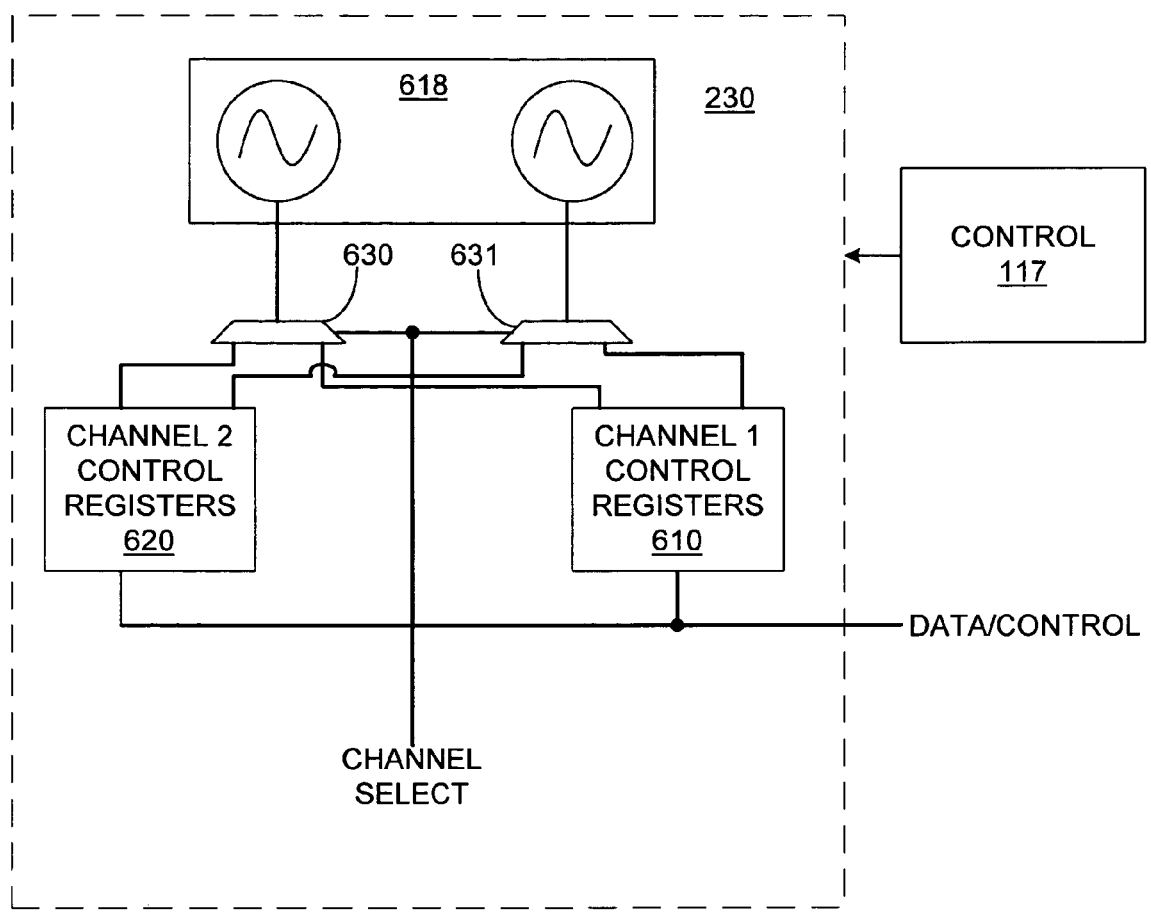
FIG. 6 illustrates, in block diagram form, an alternative implementation of the tuner of FIG. 1.

FIG. 6 illustrates another implementation in accordance with the present invention. In FIG. 6, there is a set of channel 1 control registers 610 and a set of channel 2 control registers 620. Each of the register sets 610 and 620 include an IF1 register as well as an IF2 register. The IF1 registers of both channel 1 and channel 2 are provided to a multiplexor 630. Likewise, the IF2 registers of channel 1 and channel 2 are provided to a multiplexor 631. A common channel select signal is received by each of the multiplexors 630 and 631. When in a first state, the channel 1 controller register values are provided to the frequency generator 618. When the channel select is in a second state, the channel 2 control register values are provided to the frequency generator 618. In this manner, it is possible to load the channel 1 and channel 2 control registers 610 and 620 with data, and other control information, in order to provide for rapid switching between selected channels. As previously discussed, the control portion 117 can used in order to monitor the received signals to determine when a vertical blanking interrupt, or other appropriate signal event, occurs to switch between the selected channels.

Figure 7:
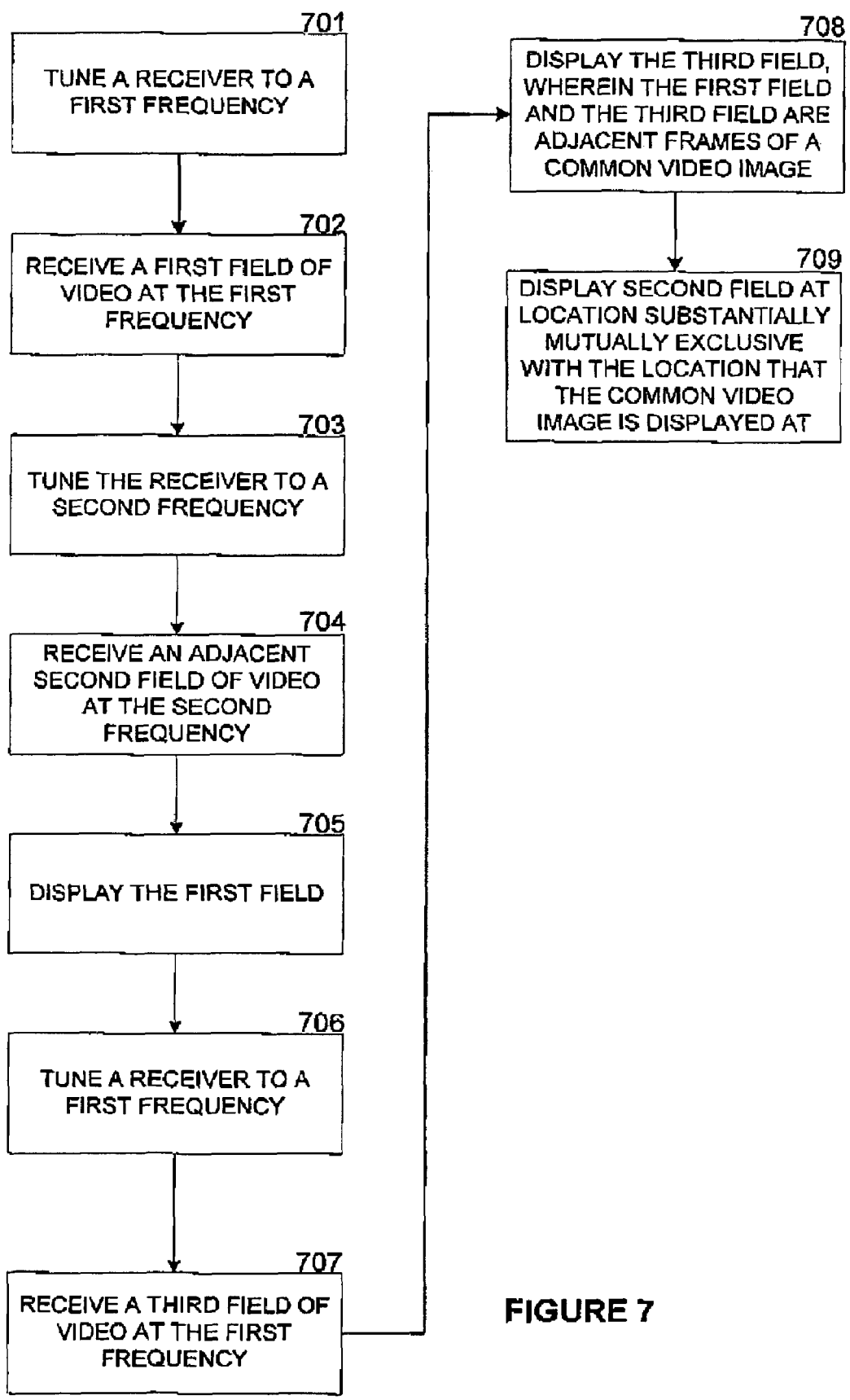

FIG. 7 illustrates a method in accordance with the present invention. At step 701, the receiver is tuned to a first frequency. As discussed previously, this is accomplished by providing an IF1 control register value, and an IF2 control register value. Based upon the IF1 and IF2 control registers values, a specific channel of video can be received by the tuner.

At step 702, a first field of video associated with the first frequency is received. As discussed with reference to FIG. 3, a field of video is described to be at least a portion of a frame of video. Whereby a frame of video represents an entire screen of information.

At step 703, the receiver is tuned to a second frequency. In a specific implementation, this occurs during the vertical blanking interval of the composite signal. When provided during the vertical blanking interval, the step of providing needs to occur in less than approximately 1.2 milliseconds. During this time period Phase Locked Loop settling should occur.

At step 704, a second field of video associated with the second frequency is received. The first frame of video and the second frame of video are adjacent in time. Referring to FIG. 3, adjacent in time for fields of different frequencies means receiving a first field of video during time T1 for a first frequency, and a field at time T2 for a second frequency.

At step 705 the first field of video is displayed. It should be noted, that the first field of video may actually include interpolated data from previously or subsequently received frames or fields of data.

At step 706, the receiver is tuned to the first frequency after the step of receiving the second field.

At step 707, a third field associated with the first frequency is received.

At step 708, the third field is displayed, wherein the first field and the third field are associated with adjacent frames of a common video image. Referring to FIG. 3, adjacent video image fields would include F1A and F2A. In other words, the first frame would include fields transmitted from time T1 through time T2, while the second adjacent frame associated with full motion video would include fields transmitted from time T3 through time T4.

At step 709, the second field, is displayed in an area of the display device that is substantially mutually exclusive from the first image. In other words, the second image is displayed in a separate window, or a separate portion of the screen from the first image, such that the first image and the second image can be displayed simultaneously on a single display device, or on multiple display devices simultaneously.

The present invention provides an advantage over the prior art in that it allows for multiple video signals to be received using a single tuner. The multiple images can be displayed simultaneously on a single device, such as in a picture in a picture format, or on separate display devices. Being able to control a tuner that can receive multiple images simultaneously is an advantage over the prior art, in that it reduces the need for a second tuner whether associated with the television, or with an associated video cassette recorder as discussed previously. One of ordinary skill in the art will understand that various implementations of the present invention can implemented without departing from the scope of the claimed invention herein.

We claim:

1. A method for tuning a system comprising:
   tuning a video tuner to a first frequency;
   receiving a first field of video on the first frequency;
   interpolating missing image data for the received first field;
   after a video blanking interval is detected in a video signal on the first frequency, tuning the video tuner to a second frequency;
   displaying the first field of video with interpolated missing image data on a display device;
   receiving a first field of video on the second frequency;
   interpolating missing image data for the received first field on the second frequency;
   after a video blanking interval is detected in a video signal on the second frequency, retuning the video tuner to the first frequency; and
   displaying the second field of video with the interpolated missing image data on the display device.

2. The method of claim 1 further comprising:
   providing a second frequency indicator to the video tuner prior to the step of tuning the video tuner to a second frequency.

3. The method of claim 2, wherein the step of providing includes providing the second frequency indicator in less than approximately 1.2 milliseconds.

4. The method of claim 1 wherein interpolating missing image data for each of the received first field on the first frequency and the first field on the second frequency, includes interpolating data based on previously or subsequently received fields of data.

* * * * *